United States Patent
Kalaboukis et al.

(10) Patent No.: US 9,222,780 B2
(45) Date of Patent: Dec. 29, 2015

(54) SYSTEM AND METHOD FOR DETERMINATION AND DISPLAY OF PERSONALIZED DISTANCE

(71) Applicant: Yahoo! Inc., Sunnyvale, CA (US)

(72) Inventors: Chris Kalaboukis, Los Gatos, CA (US); Christopher W. Higgins, Portland, OR (US); Marc Davis, Sunnyvale, CA (US); Joseph O'Sullivan, Sunnyvale, CA (US); Athellina Athsani, San Jose, CA (US); Ronald Martinez, San Francisco, CA (US); Christopher T. Paretti, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 38 days.

(21) Appl. No.: 14/144,981

(22) Filed: Dec. 31, 2013

(65) Prior Publication Data

US 2014/0114572 A1 Apr. 24, 2014

Related U.S. Application Data

(63) Continuation of application No. 12/163,249, filed on Jun. 27, 2008, now Pat. No. 8,706,406.

(51) Int. Cl.

| | |
|---|---|
| *G01C 21/00* | (2006.01) |
| *G01C 21/34* | (2006.01) |
| *G06Q 50/00* | (2012.01) |
| *G06F 17/30* | (2006.01) |
| *G01C 21/36* | (2006.01) |
| *H04W 4/02* | (2009.01) |
| *H04W 4/18* | (2009.01) |

(Continued)

(52) U.S. Cl.
CPC .............. *G01C 21/00* (2013.01); *G01C 21/343* (2013.01); *G01C 21/3484* (2013.01); *G01C 21/3679* (2013.01); *G06F 17/3087* (2013.01); *G06Q 50/01* (2013.01); *H04L 67/18* (2013.01); *H04W 4/02* (2013.01); *H04W 4/023* (2013.01); *H04W 4/18* (2013.01); *G06Q 30/0266* (2013.01); *G06Q 50/30* (2013.01)

(58) Field of Classification Search
CPC . G06Q 30/0266; G06Q 50/01; G06Q 10/047; G06Q 50/30; H04W 4/18; G01C 21/3484; G01C 21/3679; G01C 21/3697; G01C 21/34; G01C 21/343; G01C 21/3641; G06F 17/3087; G06F 17/30241
USPC .......... 701/411–418, 423, 439, 300, 302, 527
See application file for complete search history.

(56) References Cited

U.S. PATENT DOCUMENTS 5,948,040 A * 9/1999 DeLorme et al. ............. 701/426
6,542,812 B1 * 4/2003 Obradovich et al. ......... 701/426

(Continued)

*Primary Examiner* — Jason Holloway
(74) *Attorney, Agent, or Firm* — Greenberg Traurig, LLP

(57) ABSTRACT

A system and method for determination and display of personalized distance. A request is received for the determination of a personalized distance over a network, wherein the request comprises an identification of a requesting user, and a plurality of real world entities comprising at least a starting location and an ending location. At least one route is determined between the first location and the second location. Spatial, temporal, topical, and social data available to the network relating to the requesting user and each real world entity and the route is retrieved using a global index of data available to the network. A personalized distance is calculated via the network between the first location and the second location using spatial, temporal, topical, and social data relating to the requesting user and each real world entity and the route. A representation of the personalized distance calculated for the route is displayed on a display medium.

20 Claims, 12 Drawing Sheets

(51) Int. Cl.
*H04L 29/08* (2006.01)
*G06Q 30/02* (2012.01)
*G06Q 50/30* (2012.01)

(56) References Cited

U.S. PATENT DOCUMENTS

| | | | |
|---|---|---|---|
| 2007/0203644 A1* | 8/2007 | Thota et al. | 701/211 |
| 2007/0239348 A1* | 10/2007 | Cheung | 701/200 |
| 2008/0027631 A1* | 1/2008 | Obradovich et al. | 701/207 |
| 2008/0097688 A1* | 4/2008 | Tashev et al. | 701/200 |
| 2008/0242317 A1* | 10/2008 | Abhyanker | 455/456.3 |
| 2009/0157312 A1* | 6/2009 | Black et al. | 701/210 |
| 2009/0182498 A1* | 7/2009 | Seymour | 701/201 |
| 2009/0319172 A1* | 12/2009 | Almeida et al. | 701/201 |
| 2010/0027527 A1* | 2/2010 | Higgins et al. | 370/351 |
| 2010/0094536 A1* | 4/2010 | Lee et al. | 701/201 |

* cited by examiner

US 9,222,780 B2

SYSTEM AND METHOD FOR DETERMINATION AND DISPLAY OF PERSONALIZED DISTANCE

CROSS REFERENCES TO RELATED APPLICATIONS

This application is a continuation of U.S. Non-Provisional application Ser. No. 12/163,249, filed on Jun. 27, 2008, now U.S. Pat. No. 8,706,406, entitled "Systems and Method for Determination and Display of Personalized Distance", the entirety of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for selecting and presenting media on a network and, more particularly, to systems and methods for selecting and presenting media on a network to tune an environment to the tastes of the users within that environment, thus improving the experience of that location.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is directed to a method. A request is received for the determination of a personalized distance over a network, wherein the request comprises an identification of a requesting user, and a plurality of real world entities comprising at least a starting location and an ending location. At least one route is determined between the first location and the second location. Spatial, temporal, topical, and social data available to the network relating to the requesting user and each real world entity and the route is retrieved using a global index of data available to the network. A personalized distance is calculated via the network between the first location and the second location using spatial, temporal, topical, and social data relating to the requesting user and each real world entity and the route. A representation of the personalized distance calculated for the route is displayed on a display medium.

In another embodiment, the invention is directed to a system. The system comprises: a request receiving module that receives requests for the calculation of personalized distances between real-world entities, wherein the request comprises a requesting user and a plurality of real-world entities comprising at least a starting location and an ending location; a route determination module that maps at least one route between starting locations and ending locations for each request received by the request receiving module; a route data retrieval module that retrieves spatial, temporal, topical, and social data available to the network relating to the requesting user and each real world entity and the route using a global index of data available to the network; a personalized distance calculation module that uses the data retrieved by the route data retrieval module to calculate a personalized distance for routes mapped by the route determination module; and a personalized distance display module that displays personalized distance calculated by the personalized distance calculation module on a display medium.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
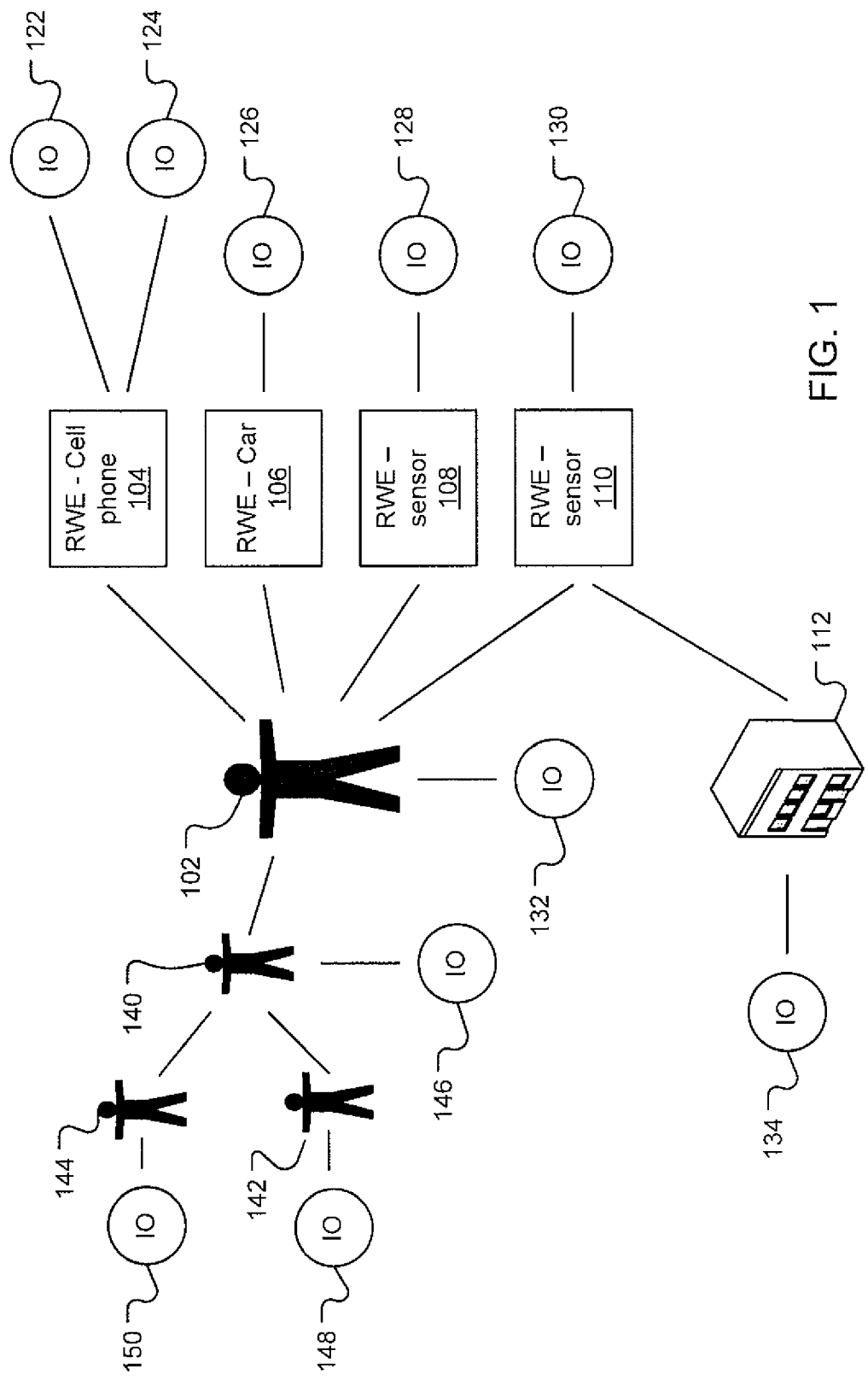
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation).

A module can include sub-modules. Software components of a module may be stored on a computer readable medium. Modules may be integral to one or more servers, or be loaded and executed by one or more servers. One or more modules may grouped into an engine or an application.

For the purposes of this disclosure an engine is a software, hardware, or firmware (or combinations thereof) system, process or functionality that performs or facilitates the processes, features, and/or functions described herein (with or without human interaction or augmentation).

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genera of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
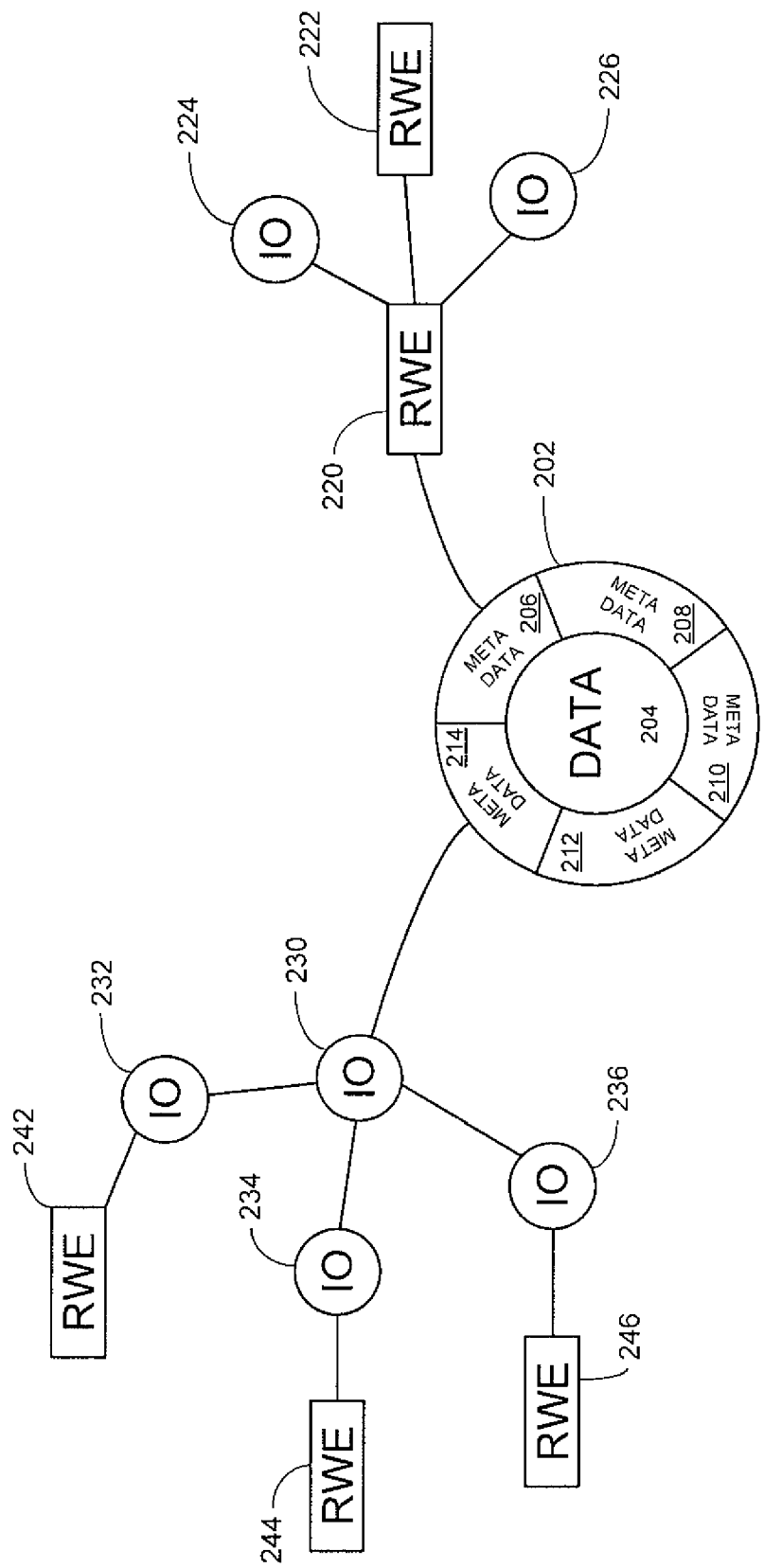
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
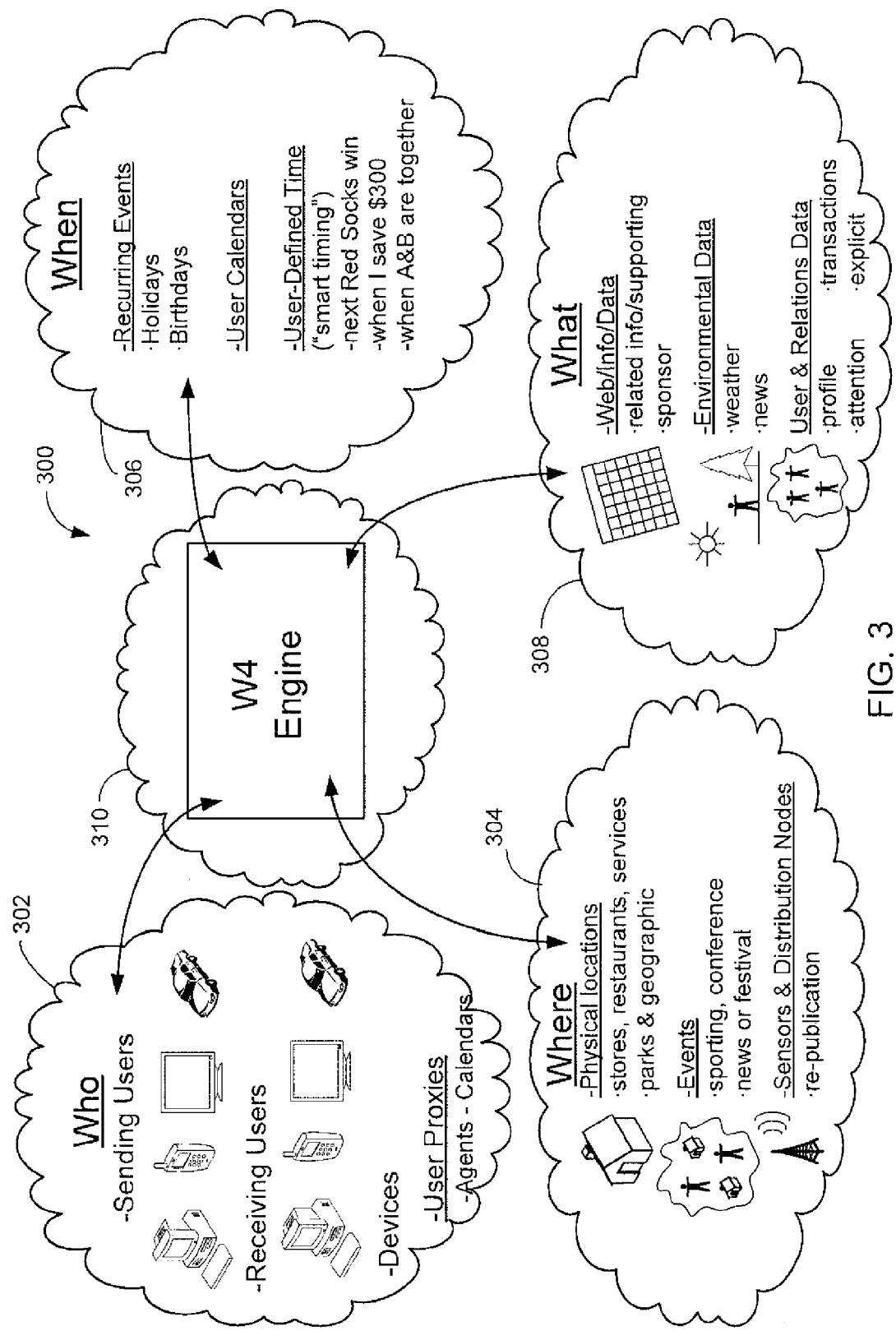
FIG. 3 illustrates a conceptual model of one embodiment of a W4 COMN.

FIG. 3 illustrates one embodiment a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
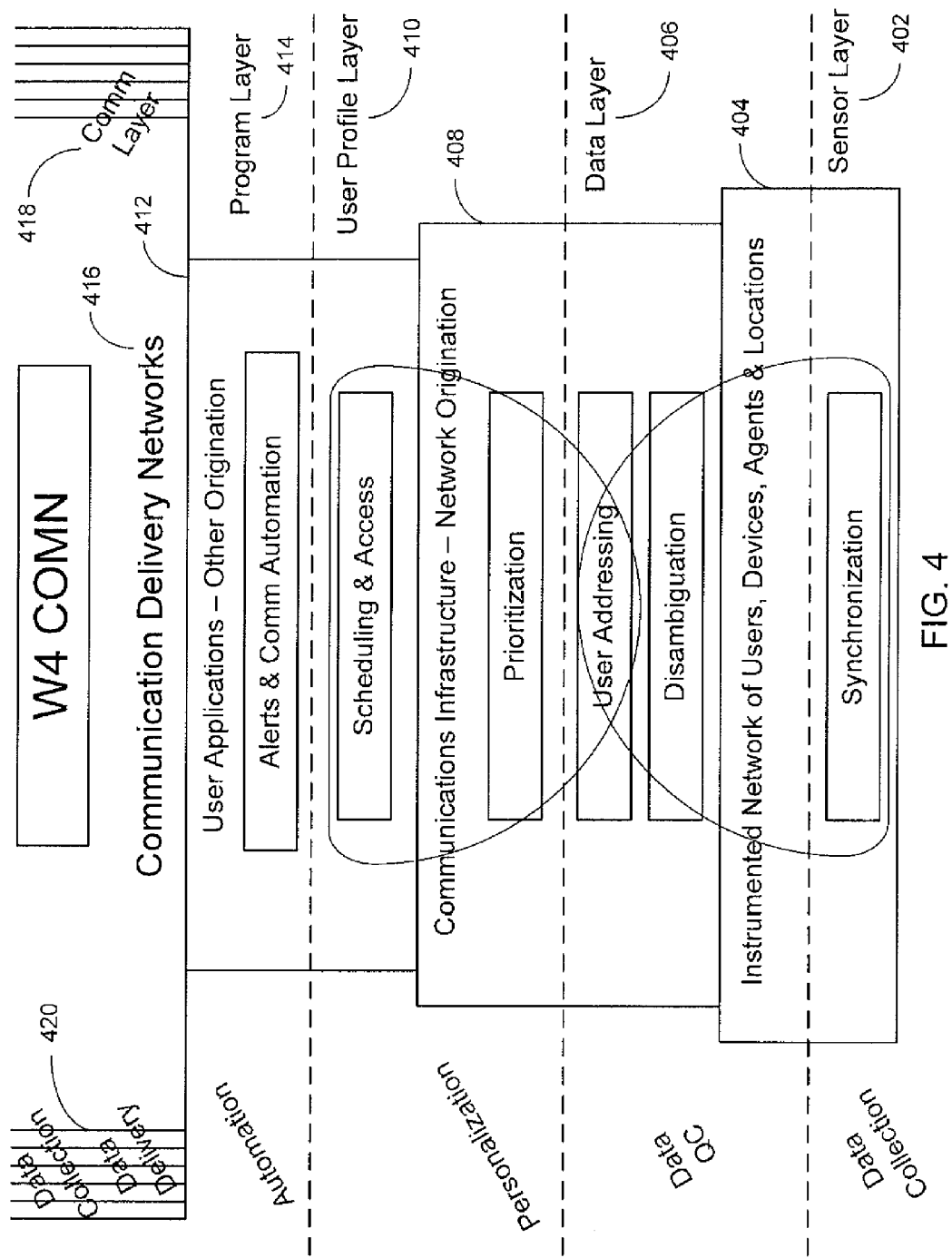
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photoblogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects of enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, entails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
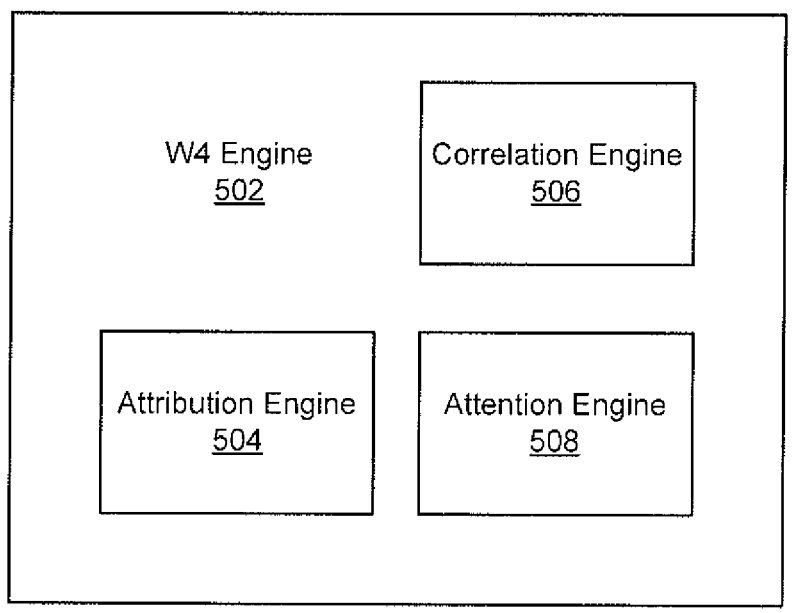
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
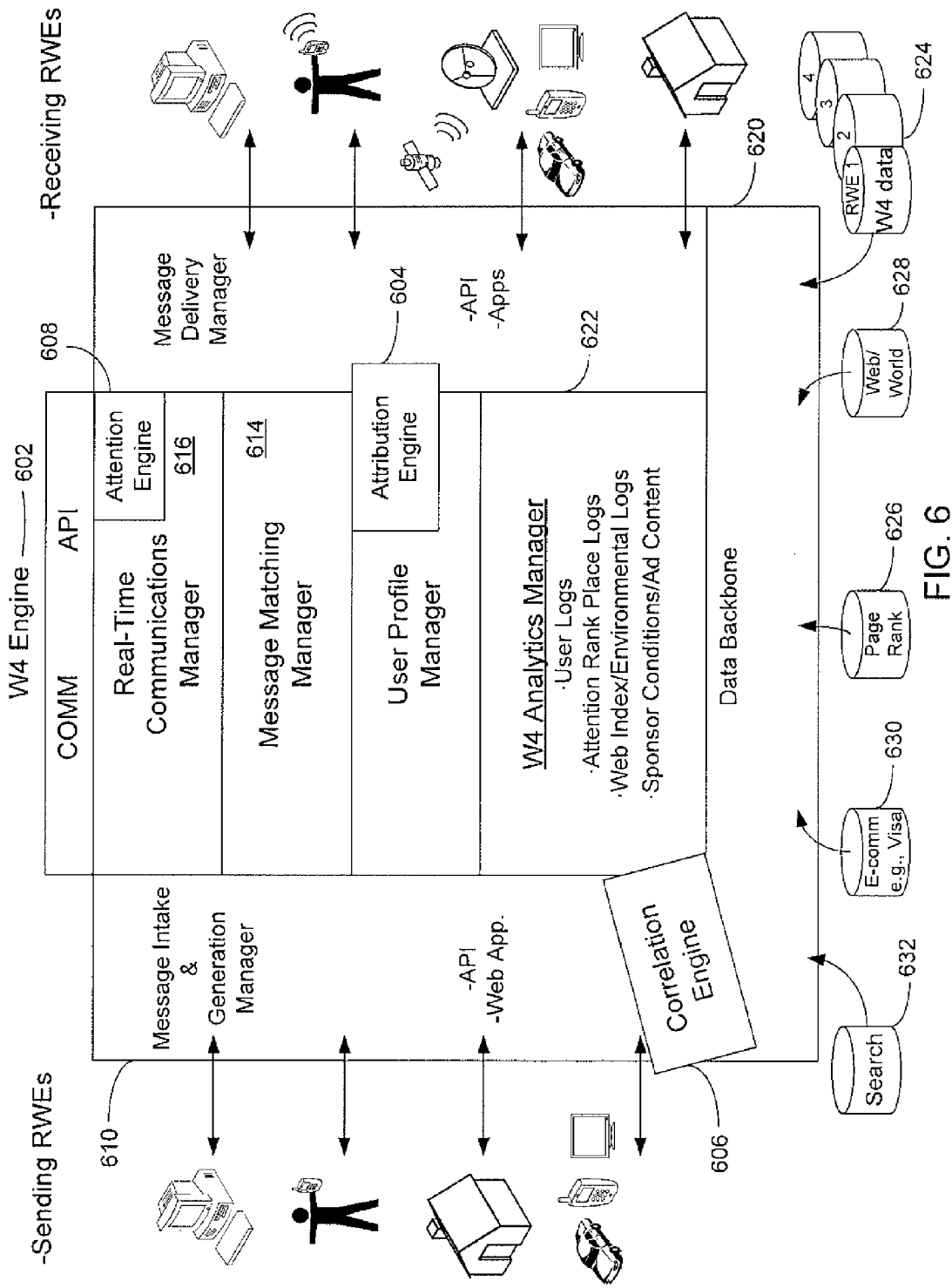
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and data stores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail |
| | Audio-based communications, such as voice calls, voice notes, voice mail |
| | Media-based communications, such as multimedia messaging service (MMS) communications |
| | Unique identifiers associated with a communication, such as phone numbers, e-mail addresses, and network addresses |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Determination and Display of Personalized Distance

In a mobile society, persons are continuously traveling from one point to another. Often, a person wants or needs to know the distance between two real-world locations. Numerous services exist to calculate spatial distance. Such services may be, without limitation, web based services, such as Yahoo! Maps, Mapquest, or may be GPS-based services. Such services calculate spatial distance tied to a specific route and may be able to estimate travel time, either based on average travel time, or based on real-time traffic data. Such services may additionally provide for a small degree of customization, such as finding routes that avoid highways or tolls.

The distances calculated by such services are not, however, typically personalized to any significant degree. A spatial distance does not factor in a person's goals or objectives in traveling between two points. Furthermore, it does not factor in a person's schedule, interests, preferences or social networks in determining the desirability of particular route. A personalized distance can be determined that takes such factors into account. The factors that can be used in determining a personal distance between two points can be categorized as spatial factors, temporal factors, social factors, and topical (or logical) factors.

In one embodiment, calculation of a personalized distance between two real-world entities can begin with determining one or more routes between two real-world entities. One or more routes can be chosen based on a user's preferred mode of travel. For example, a person may prefer to walk or use public transportation rather than driving. Routing can simply choose the shortest available route. Routing can additionally reflect further travel preferences, such as avoiding highways, tolls, school zones, construction areas, and so forth. Given a known route, spatial distance can then be determined for the route. In one embodiment, spatial distance is the length of the route. In another embodiment, the time to travel to a destination can be considered a form of spatial distance.

Spatial distance can be modified by spatial factors not directly related to distance. Such spatial factors may relate to additional spatial dimensions such as height, altitude, a floor on a building, and so forth. Such factors can relate to physical properties of the route or entities having a location on or near the route. For example, if a person values scenery or visually stimulating surroundings, whether natural, or manmade, a route that has a view of a bay or ocean or skyline can be more desirable. If a portion of a route has a reputation for being in poor physical condition or is under construction, the route can be considered less desirable. Spacial factors may additionally include the additional dimension of velocity (i.e. direction and speed) of a user or other entities. Spatial factors may additionally include environmental conditions tied to physical locations, such as local weather conditions.

Spatial distance can then be further modified using temporal factors, social factors, and topical factors. Temporal factors can be generally defined as factors that relate to how the passage of time affects the desirability of a route and the mode of transportation. The most basic temporal factor is the time it takes to travel a route. Travel time on a route can be estimated based on average travel time historically associated with a route. Alternatively, travel time can be more precisely determined by monitoring average speed and travel times from real-time monitors or sensors. Such sensors can be fixed sensors specifically installed along major avenues of travel for monitoring traffic flow. Such sensors can also be user devices, such as cellular telephones or GPSs whose location is continuously monitored and which can thus be used to determine the speed of travel for individual user devices whose physical position is known. In one embodiment, data used to determine travel time on a route may be a combination of many sources of data from multiple sensor networks.

Such travel time can be useful, but can be enhanced by combining it with historical travel time data accumulated over a period of time. For example, on Friday, people may historically leave the office earlier, and traffic predictably suffers a 15 to 20 minute slow down between 6:00 PM and 7:00 PM on major routes out of a city. Thus, the speed of traffic at 5:45 PM may provide an overly optimistic estimate of travel time between 6:00 PM and 7:00 PM for a person whose commute would normally be 30 minutes.

Travel time can also be affected by weather conditions. Thus, when it begins to rain, historically, traffic may suffer a 30 minute slow on major routes out of a city. Thus, if rain is predicted or if it just begins to rain, travel time for such routes may be adjusted accordingly. Travel time can also be affected by local events. For example, a concert may be booked at a large arena downtown for a specific date starting at 7:00 PM. Historical data may indicate that traffic slows down in the vicinity of the arena during concerts, increasing commute times by 10 minutes.

Temporal factors can additionally include temporal data relating to the starting point and ending points of a route. For example, if the destination of a route is a restaurant or a retail location, if the location closes before the route can be fully traversed, the route is undesirable. If the wait time to be seated at a restaurant exceeds, for example, 30 minutes, the route may also be undesirable. If an event is scheduled to occur at a location at a particular time, for example, live music begins at 10 PM, a route that arrives at the location after 10:00 PM may be undesirable.

Temporal factors can additionally include temporal data relating to a specific person. For example, if a person has an appointment, a route that arrives early for the appointment is desirable. If a person typically engages in specific activities at home, such as viewing a specific television program, a route that takes a person to a location away from home, for example, a restaurant, that is so distant that the person will not be able to reach home before the program airs may be undesirable.

Thus, the time it takes to traverse a route, informed by real-time and historical data, and the impact of such travel time on cotemporaneous events can be determined for a specific route or a group of routes. Spatial distance, travel time, and events affected by travel time can, in one embodiment, be displayed individually. Alternatively, temporal factors can be used to modify spatial distance to create a personalized distance. The personalized distance reflects the overall desirability of the route. In one embodiment, the distance increases as the desirability of the route decreases. For example, a route that reflects a spatial distance of 10 miles may be increased to 30 miles because of slow travel time or because the route will arrive late for an appointment based on real-time travel estimates. A route which is expressed as a temporal distance of 10 minutes may be increased to 30 minutes or "TL" for too long if the route will arrive late for an appointment based on real-time travel estimates.

In one embodiment, temporal factors can be used as weighting factors or additive factors that are used to modify spatial distance in a consistent manner. Weighting and additive factors can be used to reflect a simple, continuous numerical relationship. For example, if a 10 mile route is projected to have a travel time of 30 minutes, reflecting an average speed of 20 mph, whereas 60 mph is taken to be an arbitrary target travel speed, a weighted distance of 30 miles could be computed by multiplying the travel time by the target travel speed. In another example, an arbitrary increment of 1 mile can be added to spatial distance for every additional minute a person is projected to be late for an appointment. In another embodiment, a pre-defined code or tag could be associated with the spatial distance, e.g. "10L" for ten minutes late, or "IL" for too late or too long.

Weighting and additive factors can additionally or alternatively, be used reflect a discrete intervals used multiplicatively or additionally. For example, if a person is projected to be late for an appointment from 1 to 10 minutes, a multiplier of 1.5 or an addition of 10 miles could be applied to spatial distance, whereas if a person is projected to be 11-20 minutes late, a multiplier of 10 or an addition of 100 miles could be applied to spatial distance.

Spatial distance can thus be weighted by temporal factors in a large number of ways to produce a qualitative personal distance that reflects spatial distance of a route and also reflects the impact of temporal factors on the desirability (or even feasibility) of the route. In one embodiment, the exact methodology for combining spatial distance and temporal weighting factors can vary from person to person, and can be customized to reflect the personality or habits of a person. Thus, a person who hates driving may heavily weight travel time, whereas an obsessively punctual person may heavily weight being late for work or appointments. In one embodiment, the user can explicitly input such preferences. In another embodiment, such preferences may be imputed user behavior which is reflected by sensor data and interaction data for the user accumulated over time.

Spatial distance can additionally be modified using social factors. Social factors can be generally defined as factors that relate to how a person's social relations affects the desirability of a route. A route can be considered more desirable if the route is in proximity to one or more individuals who are in a person's social network or otherwise demonstrate a social relation with a user on the basis of spatial, temporal, or topical associations, correlations, overlaps or degrees of separation.

Such factors could be based on profile data associated with individuals in a person's social network. For example, a route that passes the home address of a close friend can be considered more desirable, as it offers the potential opportunity to drop in on a friend. Such factors could also be based on dynamic, real time data associated with persons in a social network. For example, a route to a location may be considered more desirable if one or more friends or acquaintances are currently present at that location.

Social factors may also make use of interaction or transaction data associated with individuals in a person's social network. For example, a route to a location may be considered more desirable if the location is a business which is frequented or favorably reviewed by one or more friends or relatives. In another example, a route containing roads that have been unfavorably commented on by friends or are habitually avoided by friends can be considered less desirable.

Social network factors can also be used in a negative fashion as well. Thus, if an individual is identified within a person's social network as a person to be avoided, routes that tend to avoid the individual and businesses and locales frequented by the individual may be considered preferable.

Spatial distance can additionally be modified using topical factors. Topical factors can be generally defined as including factors that relate to known information associated with locations, users, and other entities in the environment. Such factors can relate to how a person's interests and preferences, as well as external events, affects the desirability of a route. For example, topical factors may relate to the general area surrounding the route. For if a person is safety conscious, a route that passes through an area that has a high crime rate can be considered less desirable. If a person enjoys shopping for haute couture, a route that passes through an area that has a high density of high end retailers or boutiques may be more desirable. Topical factors may relate to events occurring on or in the vicinity of the route. For example, if a festival is occurring in a neighborhood, a route that passes through the neighborhood may be more or less desirable, depending on whether a person has an interest in the festival or not.

Topical factors may relate to the destination of the route. For example, a route to a location may be considered more desirable if the location is a business which is associated with a topic of interest (or aversion) to the user. For example, if a person is a fan of blues music, a route to a destination associated with blues music (i.e. a blue's club) can be considered more desirable. In another example, if a person doesn't like children, a route to a destination that is rated as a great family destination can be considered less desirable. A route to a location may be considered more desirable if the location is a business which is favorably reviewed by a favorite reporter or news publication or a friend. For example, a route to a restaurant which has received glowing reviews in local publications can be considered more desirable, but may be less desirable if a user's best friend gives the restaurant a bad review. Topical factors can thus be weighted by any known social factor related to the topic.

In one embodiment, social and topical factors can be used in addition to temporal factors as weighting factors or additive factors that are used to modify spatial distance in a consistent manner to produce a personalized distance. In one embodiment, the exact methodology for combining spatial distance and temporal weighting factors can vary from person to person, and can be customized to reflect the personality, habits, and preferences of a person.

Note that the methodologies described above can be extended to determine a personalized distance which is not tied to a physical route, or even to spatial or temporal dimensions. In one embodiment, the route is a straight line between the starting location and the ending location, a relative distance from a central third point, or a calculation based on a cluster of locations, and can be adjusted by social and topical factors.

In yet another embodiment, spatial and temporal dimensions are ignored and the personalized distance between the starting location and the ending location is based on social and topical factors relating to the requesting user, the starting and ending location, and all known RWEs and IOs associated with the user and the starting and ending location Such a personalized distance becomes, in effect, a metric which measures how closely the starting and ending locations relate to the requesting user's interests and associations.

The embodiments of the present invention discussed below illustrate application of the present invention within a W4 COMN. Nevertheless, it is understood that the invention can be implemented using any networked system which is capable of tracking the physical location of users and media enabled electronic devices, and which is further capable of collecting and storing user profile data, location data, as well as temporal, spatial, topical and social data relating to users and their devices.

A W4 COMN can provide a platform that enables the determination of personalized distances between two or more real world objects that includes spatial factors, temporal factors, social factors, and topical factors. The W4 COMN is able to achieve such a result, in part, because the W4 COMN is aware of the physical location of persons and the relative location of places, and is further aware of the preferences of such persons and places and their relationship to one another and to the greater network.

Figure 7:
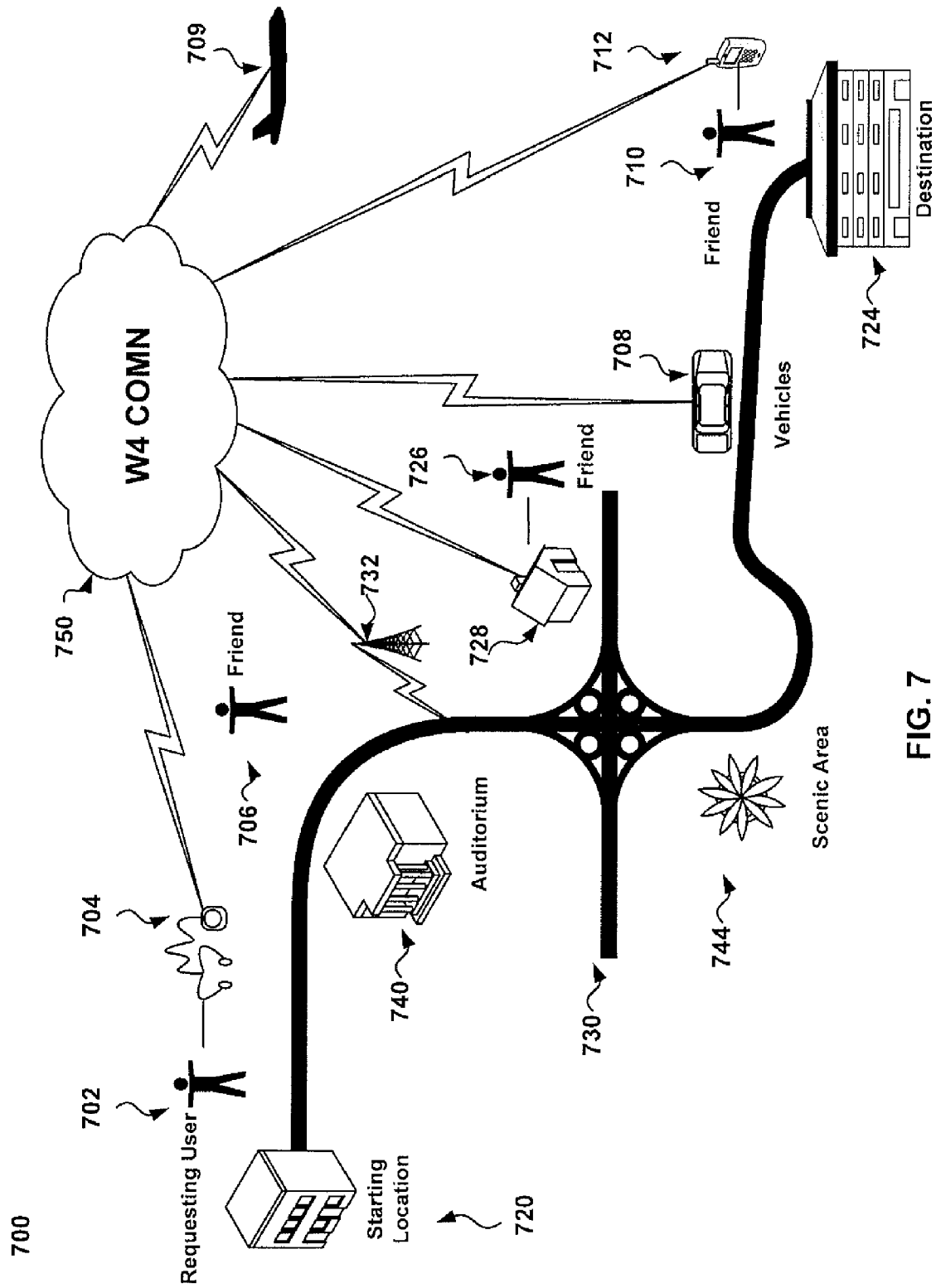
FIG. 7. illustrates one embodiment of the use of a W4 COMN for the determination of personalized distances between two or more real world objects

FIG. 7. illustrates one embodiment of the use of a W4 COMN for the determination of personalized distances between two or more real world objects.

In the illustrated embodiment, an individual 702 wishes to determine a personalized distance between a starting location 720 and an ending location 724. In one embodiment, a user 704 enters a personalized location request using a user proxy device 704, for example a PDA or portable media player, which is transmitted to a W4 COMN 750. In one embodiment, the request comprises the starting location 720 and the ending location 724. In alternative embodiments, the user may choose to enter more than two locations, which in one embodiment, can comprise a starting location 720 and an ending location 724 and one or more additional locations, for example an auditorium (i.e. to buy event tickets) and a friend's house 718 (i.e. to stop and visit.)

At least one physical route 730 exists between the starting 720 and ending locations 724. The route can be identified by a mapping application, such as, for example, Yahoo Maps, that is capable of plotting routes along highways and roads between two locations. Alternatively, the route can be specified in the personalized location request. The routes may be, without limitation, routes proceeding along roads and highways, may be a pedestrian route, and may include segments utilizing mass transit. Where a route request comprises more than two locations, each route will include all locations in the route request, and may provide alternate routes with differing ending locations. For example a route request starting at location 720 and including locations 740, 718, and 724 could generate alternate routes ending at location 718 and location 724.

There are fixed traffic sensors 730 along all or part of the route. The sensors are in communication with the W4 COMN and continuously transmit real-time data including at least traffic information to the W4 COMN. Additionally or alternatively, the W4 COMN can track the location of network user devices which are traveling on the route 730. For example, the network can determine the location of cell phones by triangulating cellular signals or through the use of embedded GPS. Vehicles 708 may additionally contain sensors or geo-locatable devices which includes the vehicles rate, direction, and mode of motion. Such vehicles may include the user's vehicle. Additionally or alternatively, the W4 COMN can track alerts and traffic advisories transmitted by local authorities, or data provided by the local 911 network (not shown.) Additionally or alternatively, the W4 COMN can track the movement of air traffic 709 as well as vehicular traffic.

The route begins at a starting location 720. The starting location can be a physical point, an address, or a real-world entity, such as a building or an individual (e.g. the requesting user.) The route 730 proceeds past a municipal auditorium 740 that periodically hosts events such as concerts. The route additionally passes near the home 728 of a friend of the user 702. The route additionally passes a scenic area 744 such as a shoreline, an overlook, or a clear view of a city skyline. The location terminates at an ending location 724. The ending location can be a physical point, an address, or a real-world entity, such as a building or an individual whose position is known to the network (e.g. a friend of the requesting user with a device whose position is known through, e.g. GPS.)

The requesting user 702 has three friends 706, 710, and 726 known to the network. User 706 is a friend of requesting user 702, but has no association with the route 730. User 726 has a home located 728 on the route 730. User 710 is currently located at the ending location 724. User 710 has a proxy device 712, such as a smart phone, that is in communication with the W4 COMN and whose geographical position can be determined, for example, by GPS technologies or triangulation of cellular signals.

Physical locations of any type, such as starting location 720 and an ending location 724, can further contain or be associated with proxy devices known to the network. Such devices can include proxy devices associated with, without limitation, other users' proxy devices, vending machines, printers, appliances, LANs, WANs, WiFi devices, and RFID tags which can provide additional information to the network. All of the entities shown in FIG. 7 may be known to the W4 COMN, and all network connectable devices and sensors may be connected to, or tracked by, the W4 COMN (note, all possible connections are not shown in FIG. 7.)

Figure 8:
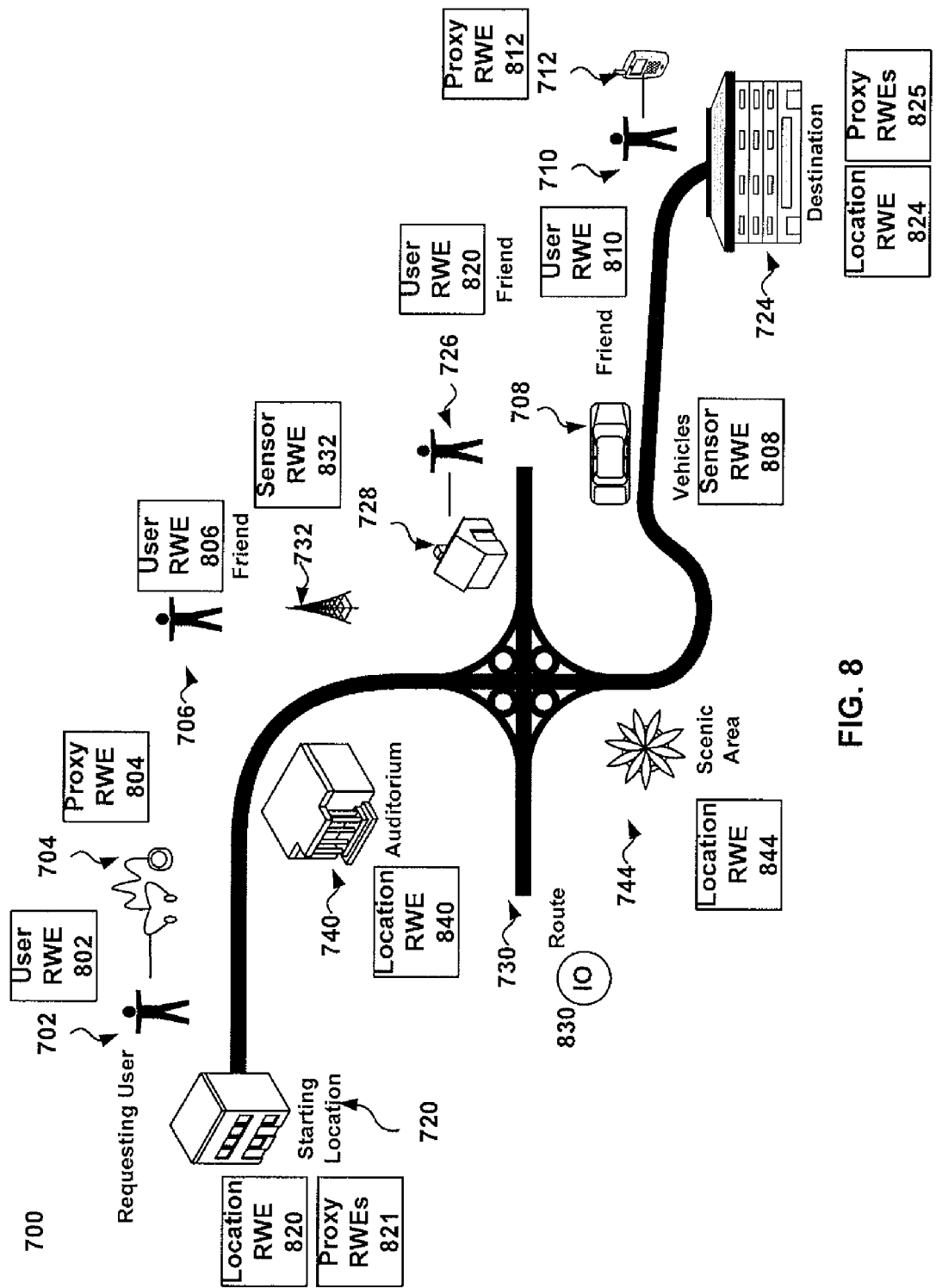
FIG. 8 illustrates one embodiment of how the users and devices shown in FIG. 7 can be defined to a W4 COMN.

FIG. 8 illustrates one embodiment of how the objects shown in FIG. 7 can be defined to a W4 COMN.

Individuals 702, 706, 712 and 726 are represented as user RWEs 802, 806, 810 and 826 respectively. Each individual's devices are represented as proxy RWEs 804, and 812. Locations 720, 724, and 740 are represented as location (or business) RWEs 820, 824, and 840. The traffic sensor 730 is represented as a sensor RWE 830. The route 730 is represented as a IO 830 containing route information. The scenic area is represented by an RWE which includes information on the location and other attributes of the scenic area. All RWEs can have additionally have, without limitation, IOs associated with RWEs proxies, friends, and friends proxies.

Figure 9:
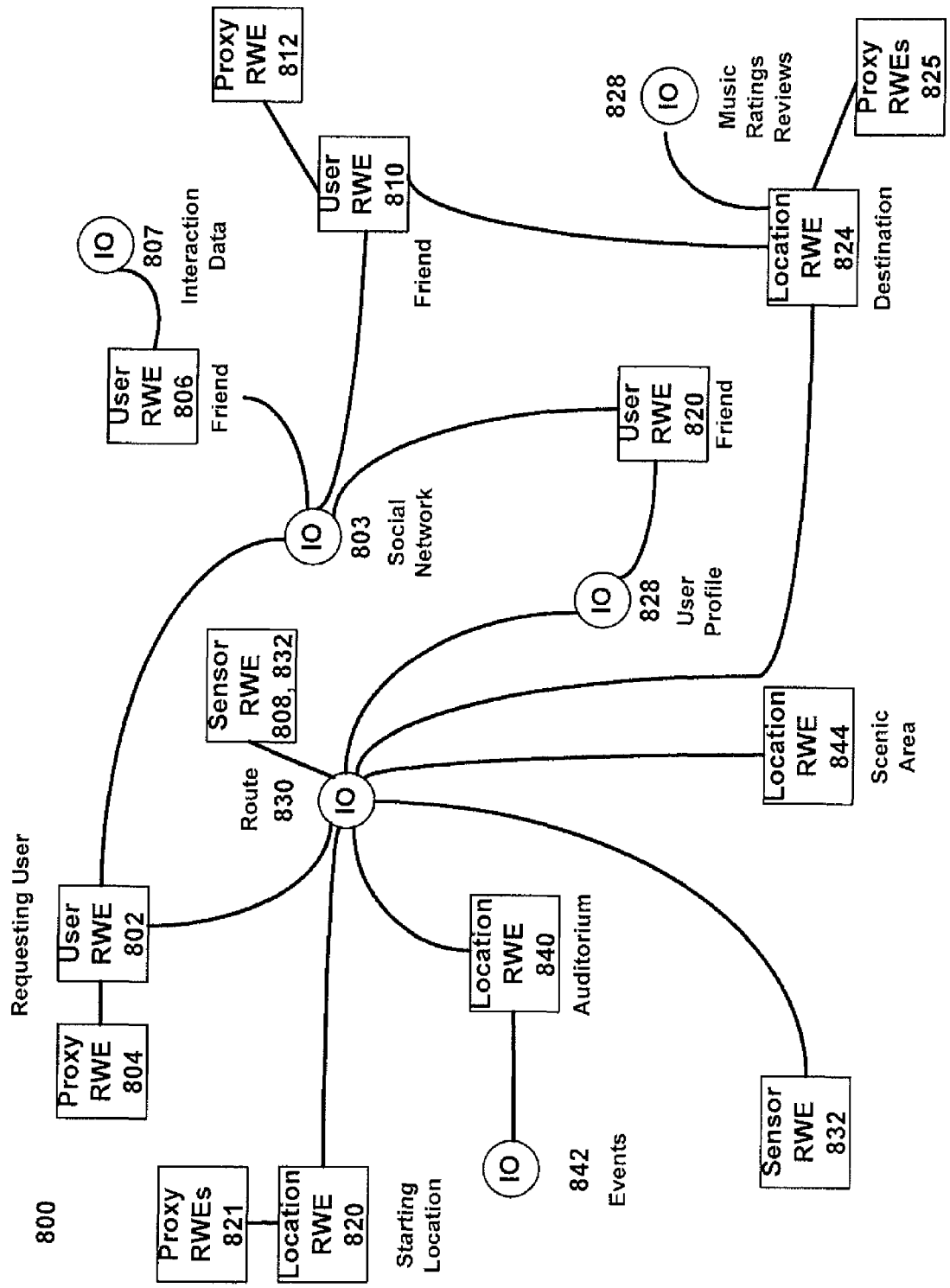
FIG. 9 illustrates one embodiment of a data model showing how the RWEs shown in FIG. 8 can be related to entities and objects within a W4 COMN.

FIG. 9 illustrates one embodiment of a data model showing how the RWEs shown in FIG. 8 can be related to entities and objects within a W4 COMN.

The RWE for the requesting user is associated with a route IO 830. The route IO 830 includes, in one embodiment, sufficient data to fully define the physical route, such as road segments and distances or a set of GPS coordinates. The route IO is directly associated with a set of RWEs: RWE 820 representing the starting location of the route; RWE 830 representing a traffic sensor on the route; RWE 840 representing a municipal auditorium on or near the route and a scenic area 844; and RWE 824 representing the ending location.

In the illustrated embodiment, the route IO is further associated with two IOs relating to topics: IO 828 representing the user profile of an RWE 820 representing a friend 820 of the requesting user whose home address is located on or near the route. Note that the route IO may be directly related to any or all IOs associated with physical locations along the route, but is also indirectly related to an unbounded set of IOs related to spatial, temporal, and topical factors related to the route and requesting user. For example, in FIG. 9, the route is indirectly related to user 802's friends 806, 810, and 820 through user 802's social network. In FIG. 9, every IO shown is related directly or indirectly to the route 830.

The requesting user RWE is associated with friend/user RWEs 806, 810, and 820 through a social network represented by an IO relating to a topic 803. User RWE 806 is associated with one or more interaction data IO that can include, without limitation, communications relating to ending location RWE 824 and other users or locations. User RWE 810 is associated with the ending location RWE 824, for example, by an association indicating the user is physically present at the location. User RWE 810 is also associated with a user proxy device RWE 812 whose physical location is known.

The location RWE 840 for the municipal auditorium is further associated with an IO having information on events occurring at the auditorium, including a calendar with dates and times of events. The location RWE 824 for the destination is further associated with one or more IOs relating to topics 828 which may include, without limitation, a calendar of live music to be performed at the destination, ratings by customers of the destination location, or reviews of the location by local media.

In one embodiment, the relationships shown in FIG. 9 are created by the W4 COMN using a data modeling strategy for creating profiles and other types of IOs relating to topics for users, locations, any device on the network and any kind of user-defined data. Using social, spatial, temporal and topical data available about a specific user, topic or logical data object, every entity known to the W4 COMN can be mapped and represented against all other known entities and data objects in order to create both a micro graph for every entity, as well as a global graph that relates all known entities with one another and relatively from each other. In one embodiment, such relationships between entities and data objects are stored in a global index within the W4 COMN.

Figure 10:
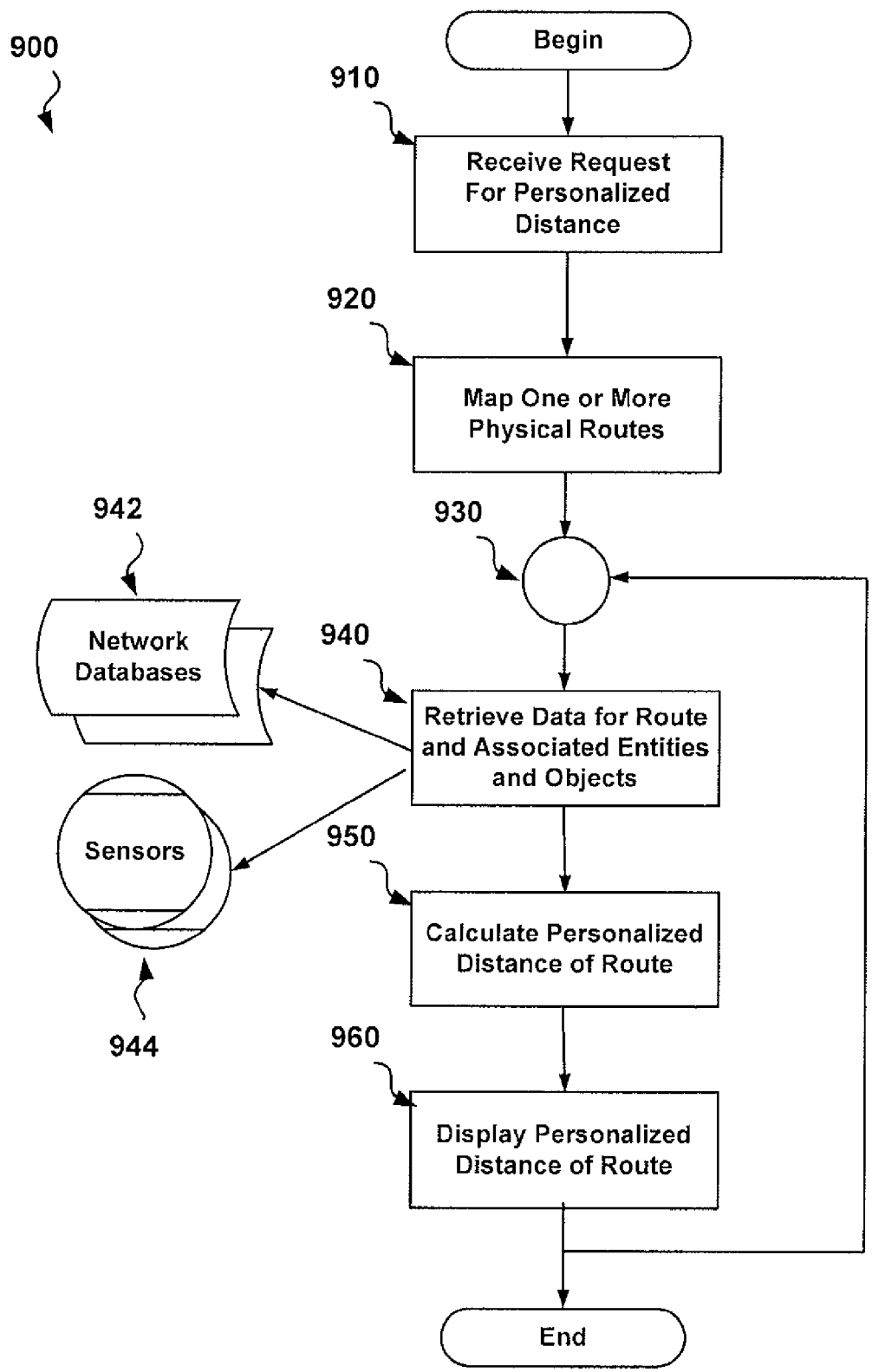
FIG. 10 illustrates one embodiment of a process 900 of how a network having temporal, spatial, and social data, for example, a W4 COMN, can be used for the determination of personalized distances between two or more real world objects.

FIG. 10 illustrates one embodiment of a process 900 of how a network having temporal, spatial, and social data, for example, a W4 COMN, can be used for the determination of personalized distances between two or more real world objects.

A request is received for the calculation of a personalized distance 910 between real-world entities, wherein the request comprises two real-world entities corresponding to a starting location and an ending location. The request may additionally include a physical route between the starting location and an ending location or other criteria. The request may be for the current time, or may be for a future point in time. One or more physical routes between the starting location and the ending location are mapped 920. For every route 930, data is retrieved 940 from network databases 942 and network sensors 944 for entities and objects associated with the route, wherein the network databases contain spatial, temporal, social, and topical data relating to entities and objects within the network. In one embodiment, the network databases 942 include a global index of RWE and IO relationships maintained by the W4 COMN. The spatial, temporal, social, and topical data is used to calculate a personalized distance 950 using one or more embodiments of methodologies discussed above. The personalized distance is then displayed 960 for each route.

Figure 11:
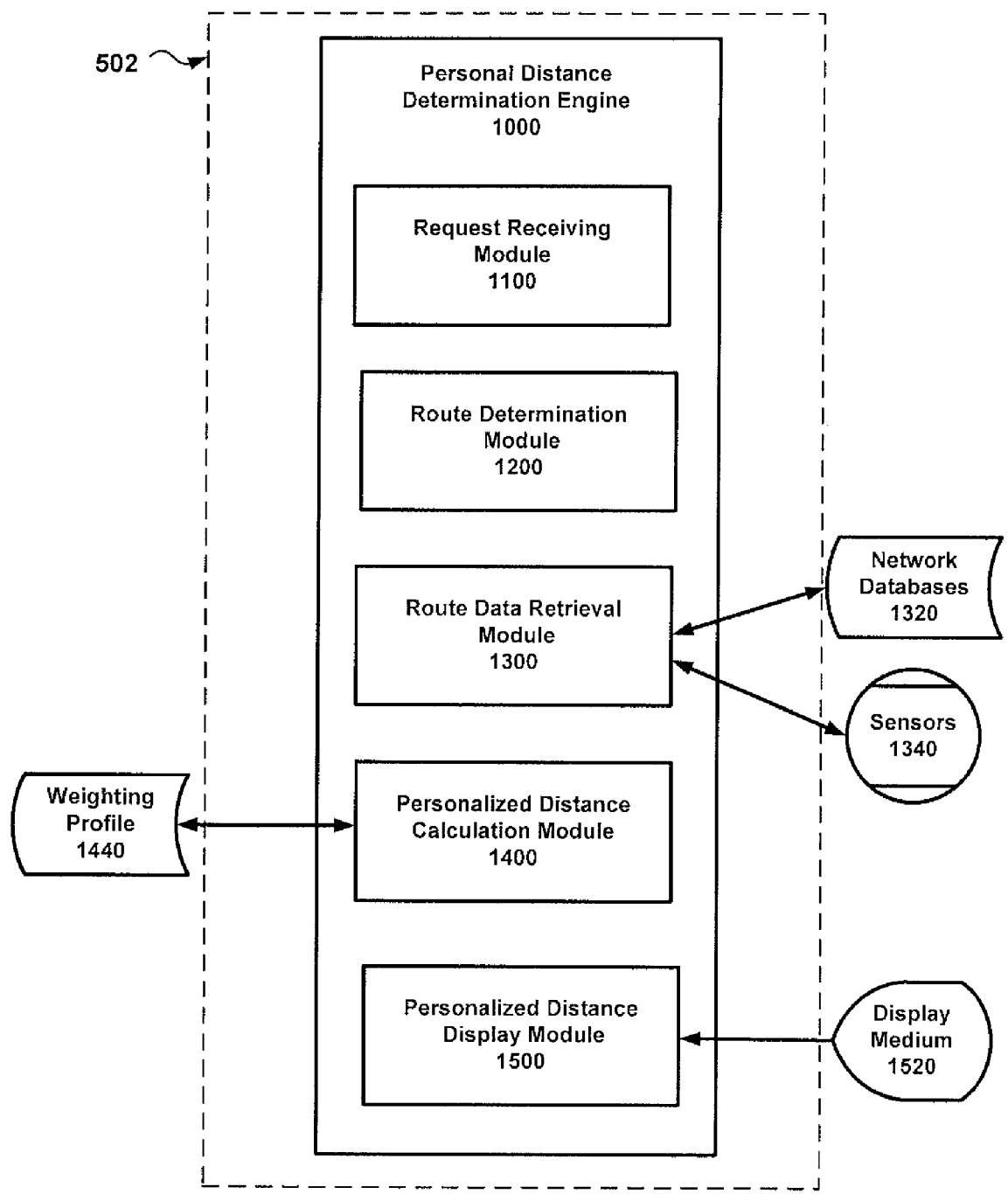
FIG. 11 illustrates one embodiment of a personal distance determination engine 1000 that is capable of supporting the process in FIG. 10.

FIG. 11 illustrates one embodiment of a personal distance determination engine 1000 that is capable of supporting the process in FIG. 10. In one embodiment, the personal distance determination engine 1000 is a component of a W4 engine 502 within a W4 COMN and may use modules within the W4 engine to support its functions.

A request receiving module 1100 receives requests for the calculation of personalized distances between real-world entities, wherein the request comprises at least two real-world entities corresponding to a starting location and an ending location. The request may additionally include a physical route between the starting location and the ending location. A route determination module 1200 maps one or more physical routes between the starting location and ending location. A route data retrieval module 1300 retrieves spatial, temporal, social, and topical data from network databases 1320 and sensors 1340 for entities and objects associated with a route. A personalized distance calculation module 1400 uses retrieved spatial, temporal, social, and topical data to calculate a personalized distance using one or more embodiments of methodologies discussed above. A personalized distance display module 1500 displays personalized distance on a display medium 1520.

In one embodiment, the request receiving module provides an interface for entry of personalized distance requests. The interface may be a graphical user interface displayable on computers or PDAs, including HTTP documents accessible over the Internet. Such an interfaces may also take other forms, including text files, such as emails, and APIs usable by software applications located on computing devices. The interface provide. In one embodiment, a personalized distance request can be entered on a mapping application interface, such as Yahoo Maps. The request may be for the current time, or may be for a future point in time.

In one embodiment, route determination module may determine routes using a mapping engine such as that provided by Yahoo! Maps that is capable of mapping a route between two locations. Alternatively, the route may be presumed to be a straight line between two locations, a relative distance from a central third point, or a calculation based on a cluster of locations. Alternatively, no physical route may be determined. In one embodiment, the route determination module returns multiple physical routes. The routes can be routes consisting entirely of roads and highways, pedestrian ways, public transportation, or any combination thereof.

In one embodiment, the distance display module displays personalized distance on a user interface. The interface can be a graphical user interface displayable on computers or PDAs, including HTTP documents accessible over the Internet. Such an interface may also take other forms, including text files, such as emails, and APIs usable by software applications located on computing devices. In one embodiment, the personalized distance for one or more routes can be listed as text or numbers. The factors used to calculate the personalized distance can be listed on same display as text or numbers so that the user can understand the basis of the calculation. In one embodiment, distances above and below a user defined threshold can be automatically excluded or preferred.

In one embodiment, a personalized distance can be displayed as an overlay of a graphical display of a map of the route to which the personalized distance relates. For example, the personalized distance could be displayed as a colored highlight over the length of the route wherein the color indicates the magnitude of the distance. For example, red could signify a distance of 20 miles or greater, or, alternatively, a route wherein the personalized distance is greater than twice the spatial distance. The personalized distance could also be displayed as a text tag on the route. Entities and objects which were used in the personalized distance calculation and which have a physical location close to the route can additionally be displayed as text tags or symbols on the map. In an alternative embodiment, the color coding of routes based on rank of users' likely preferences (e.g. the best route is colored green, the worst, brown.)

In one embodiment, in a W4 COMN, the route data retrieval module 1300 can be component of a correlation engine 506, and makes use of data relationships within the W4 COMN to retrieve data related to a route. In one embodiment, the network databases 1320 include a global index of RWE and IO relationships maintained by the W4 COMN.

For example, referring back to FIG. 9, a route IO 830 can be associated with a number of objects and entities that relate to data that can be used in calculating a personalized distance for the route. In the illustrated embodiment, the route IO relates to real-time sensors 832 that are periodically or continuously polled for data. Sensor data can include traffic data, user presence and motion data, as well as environmental data, such as temperature, visibility, and weather. Traffic sensor data can be used to calculate transit time on the route. Other types of sensed data can additionally be used as factors in computing personalized distance. For example, if it starts to rain, transit times can be increased based on historical data. Additionally or alternatively, if the requesting user RWE 820 hates driving in rain (e.g. as indicated in profile or interaction data), rain can be can be a subjective factor in a personalized distance calculation.

The route IO 830 further relates to a location RWE 840, an auditorium having a location near the route. The RWE 842 is associated with an events IO that can include a calendar of events. If there is an event scheduled for the time the route will traversed, the event can be a factor in a personalized distance calculation. The route IO 830 further relates to an IO relating to a topic for a scenic location near the route. If the requesting user 802 values scenic views (e.g. as indicated in profile or interaction data), the scenic location can be a factor in a personalized distance calculation.

In the illustrated embodiment, the route IO 830 is owned by the requesting user RWE 802. The user RWE 802 is associated through a social network with three user RWEs 806, 810 and 820 that are friends of the requesting user. The friend RWEs each relate to data that can be factors in calculating a personalized distance for the route. User RWE 806 can have interaction data or profile data relating to the destination RWE 824, such as emails or text messages expressing opinions about the destination (e.g. bad food, great music.) User RWE 810 is physically present at the destination, possibly increasing the attractiveness of the location. The profile IO 828 of user/friend RWE 820 indicates the user RWE's home is near physically near the route, and hence, it would be easy for the requesting user to drop in.

The destination location RWE 824 has topical and other IOs 828 associated with it that contain additional data that can be factors in a personalized distance calculation. A music calendar may indicate a musical performance at a specific time. Users outside of the requesting RWE's social networks may have rated the destination location for food, ambience, and service. Local media may have reviewed the destination location.

In one embodiment, the personalized distance calculation module 1400 can weight spatial, temporal, social, and topical factors differently. Such weighting may be determined automatically based on the context of the request. Since each context will have a potentially unbounded set of associated data, the personalized distance calculation module 1400 can, if sufficient information is present, determine the category of the most important factor depending on context. For example, shop hours (a temporal factor) become the primary factor for a destination of a distance to a location that is about to close, but are mostly ignored for calculations in the middle of business hours. When, for example, a friend is presently shopping there (a social factor), such a social factor becomes the most important factor for weighting a spatial distance.

Figure 12:
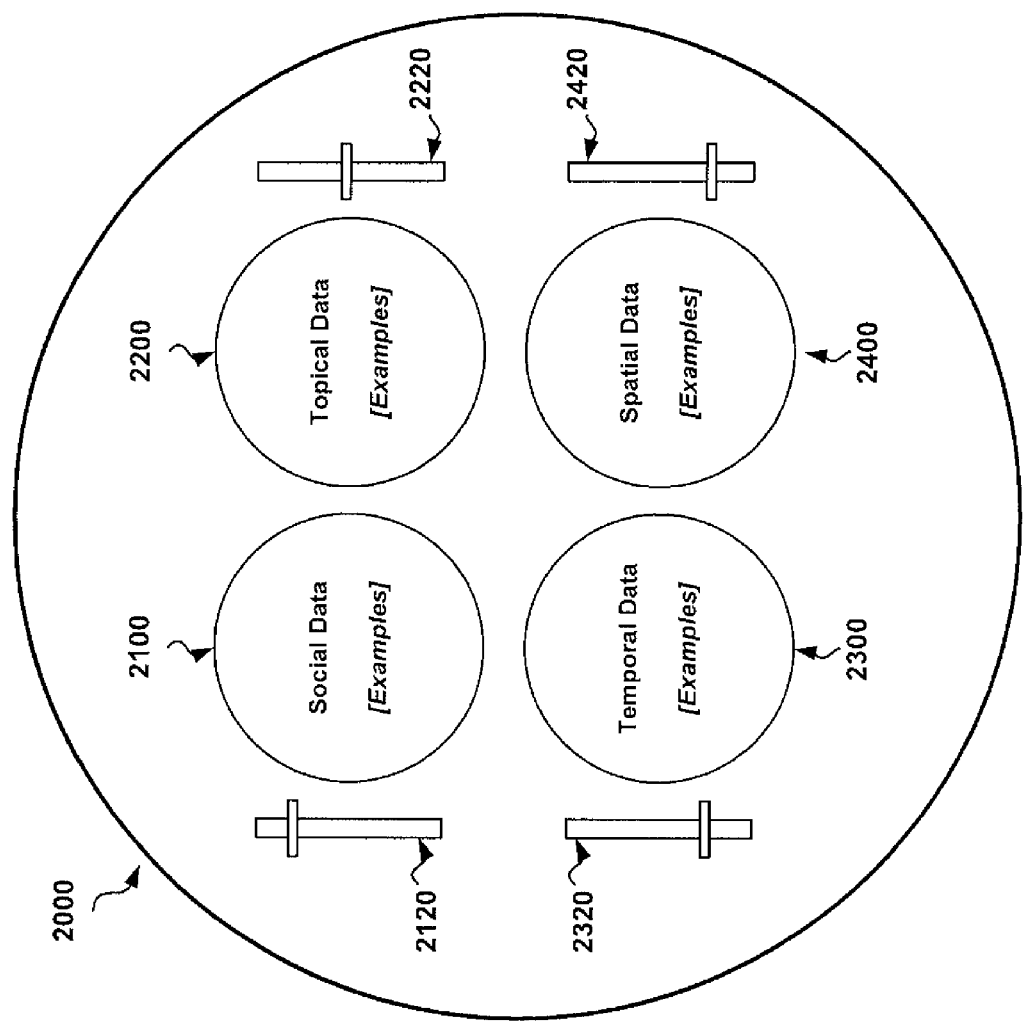
FIG. 12 illustrates a user interface for adjusting the weights of spatial, temporal, social and topical factors in a personalized distance calculation.

In one embodiment every RWE and IO associated with a personalized distance calculation has at least one data point for spatial, temporal, social, and topical factors, and can have large sets of data points for each type of factor. Such factors can be sorted and ranked for weighting a personalized distance calculation. Alternatively, or additionally, a users weighting preferences are stored on the network in a weighting profile, which can be additionally maintained using a user interface such as that shown in FIG. 12. The interface 2000 can be used to apply differential weights to spatial 2400, temporal 2300, social 2100, and topical factors 2200 using sliders 2420, 2320, 2120, and 2200.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising the steps of:
receiving, by a processor over a network, a request for the determination of a personalized distance, wherein the request comprises an identification of the user, and a plurality of real world entities comprising at least a starting location and an ending location;
determining, by the processor via the network, at least one route between the starting location and the ending location;
retrieving, by the processor, spatial, temporal, topical, and social data available to the network relating to the requesting user and each real world entity and the at least one route using a global index of data available to the network wherein respective weights for the spatial, temporal, topical and social data are received via a user interface;
modifying, by the processor, a spatial distance between the starting and the ending locations using the temporal, topical, and social data relating to the requesting user and each real world entity and the at least one route, the spatial distance being modified based on the respective weights of the temporal, topical and social data for modifying the spatial distance;
calculating, by the processor via the network, a personalized distance between the starting location and the ending location from the modified spatial distance; and
causing, by the processor, a display, on a display medium, for each of the at least one route, a representation of the personalized distance calculated for the at least one route.

2. The method of claim 1 wherein the at least one route is a physical route between a starting location and an ending location.

3. The method of claim 1 wherein the at least one route is a straight line between the starting location and the ending location.

4. The method of claim 1 wherein the at least one route is a relative distance between the starting location, the ending location, and a clustering of locations.

5. The method of claim 1 wherein the at least one route is a relative distance between the starting location, the ending location, and a third point.

6. The method of claim 1 wherein the request additionally includes a physical route between the starting location and the ending location and the physical route included in the request is used to calculate the personalized distance.

7. The method of claim 1 wherein data associated with the at least one route is retrieved, by the processor, from at least one sensor.

8. The method of claim 1 wherein the representation of the personalized distance calculated for the at least one route is an overlay of a graphical display of a map of the route to which the personalized distance relates.

9. The method of claim 1 wherein the plurality of real world entities in the request for the determination of a personalized distance additionally comprises at least a third location, and the at least one route that is determined between the starting location and the ending location additionally includes the at least a third location.

10. A system comprising:
a request receiving module that receives requests for the calculation of personalized distances between real-world entities, wherein the request comprises a requesting user and a plurality of real-world entities comprising at least a starting location and an ending location;
a route determination module that maps at least one route between starting locations and ending locations for each request received by the request receiving module;
a route data retrieval module that retrieves spatial, temporal, topical, and social data along with respective weights available to the network relating to the requesting user and each real world entity and the at least one route using a global index of data available to the network wherein the respective weights of the spatial, temporal and social data are received via a user interface;
a personalized distance calculation module that uses the data retrieved by the route data retrieval module to calculate a personalized distance for routes mapped by the route determination module, the personalized distance is calculated from a spatial distance between the starting and the ending locations modified by the temporal, topical, and the social data; and
a personalized distance display module that enables display of the personalized distance calculated by the personalized distance calculation module on a display medium.

11. The system of claim 10 wherein the at least one route mapped by the route determination module is a physical route between a starting location and an ending location.

12. The system of claim 10 wherein the at least one route mapped by the route determination module is a straight line between a starting location and an ending location.

13. The system of claim 10 wherein the at least one route mapped by the route determination module is a relative distance between the starting location, the ending location, and a clustering of locations.

14. The system of claim 10 wherein the at least one route mapped by the route determination module is a relative distance between the starting location, the ending location, and a third point.

15. The system of claim 10 wherein the request additionally includes a physical route between the starting location and the ending location and the physical route included in the request is used by the personalized distance calculation module to calculate a personalized distance.

16. The system of claim 10 wherein route data retrieval module additionally retrieves data associated with the route from at least one sensor.

17. The system of claim 10 wherein the personalized distance display module displays personalized distance as an overlay of a graphical display of a map of the route to which the personalized distance relates.

18. The system of claim 10 wherein the plurality of real world entities in the request for the determination of a personalized distance additionally comprises at least a third location, and the at least one route mapped by the route determination module additionally includes the at least a third location.

19. A non-transitory computer-readable medium having computer-executable instructions for:
receiving, by a processor over a network, a request for the determination of a personalized distance, wherein the request comprises an identification of a requesting user, and a plurality of real world entities comprising at least a starting location and an ending location;
determining, by the processor, via the network, at least one route between the starting location and the ending-location;
retrieving, by the processor, spatial, temporal, topical, and social data available to the network relating to the requesting user and each real world entity and the at least one route using a global index of data available to the network wherein respective weights for the spatial, temporal, topical and social data are received via a user interface;

modifying, by the processor, a spatial distance between the starting and the ending locations using the temporal, topical, and social data relating to the requesting user and each real world entity and the at least one route, the spatial distance being modified based on the respective weights of the temporal, topical and social data for modifying the spatial distance calculating, by the processor, via the network, a personalized distance between the starting location and the ending location from the modified spatial distance;

causing, by the processor, a display, on a display medium, for each of the at least one route, a representation the personalized distance calculated for the route.

20. The non-transitory computer-readable medium of claim 19 wherein the at least one route is a physical route between the starting location and the ending location.

\* \* \* \* \*